US011956155B2

United States Patent
Lins De Medeiros et al.

(10) Patent No.: US 11,956,155 B2
(45) Date of Patent: Apr. 9, 2024

(54) METHODS AND APPARATUS FOR PACKET DROPPING IN A FRONTHAUL NETWORK

(71) Applicant: Telefonaktiebolaget LM Ericsson (publ), Stockholm (SE)

(72) Inventors: Eduardo Lins De Medeiros, Sundbyberg (SE); Igor Almeida, Indaiatuba (BR); André Mendes Cavalcante, Indaiatuba (BR); Elmar Trojer, Täby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 149 days.

(21) Appl. No.: 17/424,307

(22) PCT Filed: Jan. 21, 2019

(86) PCT No.: PCT/EP2019/051372
§ 371 (c)(1),
(2) Date: Jul. 20, 2021

(87) PCT Pub. No.: WO2020/151802
PCT Pub. Date: Jul. 30, 2020

(65) Prior Publication Data
US 2022/0078123 A1    Mar. 10, 2022

(51) Int. Cl.
*H04L 47/00* (2022.01)
*H04L 47/2425* (2022.01)
(Continued)

(52) U.S. Cl.
CPC .......... *H04L 47/2433* (2013.01); *H04L 47/32* (2013.01); *H04W 28/0289* (2013.01)

(58) Field of Classification Search
None
See application file for complete search history.

(56) References Cited

U.S. PATENT DOCUMENTS 10,098,132 B2 * 10/2018 Tucker ............... H04W 4/24
10,716,094 B2 *  7/2020 Babaei .............. H04L 1/1848
(Continued)

FOREIGN PATENT DOCUMENTS

WO    WO2009/008817 A1    1/2009
WO    WO 2017/100394 A1   6/2017
(Continued)

OTHER PUBLICATIONS

International Search Report and Written Opinion of the International Searching Authority, PCT/EP2019/051372, dated Sep. 20, 2019, 9 pages.
(Continued)

*Primary Examiner* — Gerald A Smarth
(74) *Attorney, Agent, or Firm* — Sage Patent Group

(57) ABSTRACT

Embodiments described herein relate to methods and apparatus for managing packet dropping in the fronthaul network. A method in a packet processing system includes receiving a plurality of data packets for transmission over the fronthaul network, wherein the plurality of data packets include radio data; obtaining first information for the plurality of data packets, wherein the first information is related to transmission of the radio data over a radio access interface in the radio network; and responsive to a requirement to decrease a load in the fronthaul network, selecting at least one of the plurality of packets to drop by applying at least one prioritization rule to the plurality of data packets based on the obtained first information.

19 Claims, 10 Drawing Sheets

(51) Int. Cl.
*H04L 47/32* (2022.01)
*H04W 28/02* (2009.01)

(56) References Cited

U.S. PATENT DOCUMENTS

| | | | |
|---|---|---|---|
| 2010/0118883 A1 | 5/2010 | Jones et al. | |
| 2017/0171099 A1 | 6/2017 | Shpiner et al. | |
| 2019/0223198 A1* | 7/2019 | Halabian | H04W 28/0247 |

FOREIGN PATENT DOCUMENTS

| | | | | |
|---|---|---|---|---|
| WO | WO-2018075828 A1 * | 4/2018 | | H04W 72/02 |
| WO | WO 2018/093301 A1 | 5/2018 | | |
| WO | WO-2018121616 A1 * | 7/2018 | | H04W 48/08 |

OTHER PUBLICATIONS

Briscoe, B. et al., "Low Latency, Low Loss, Scalable Throughput (L4S) Internet Service: Architecture (draft)," Transport Area Working Group, Mar. 22, 2018, 32 pages.

ECPRI, Specification V1.1 (Jan. 10, 2018), Interface Specification, "Common Public Radio Interface: eCPRI Interface Specification," 62 pages.

Feng, Wu-chang et al., "BLUE: A New Class of Active Queue Management Algorithms," 1999, 27 pages.

Nichols, K. et al., "Definition of the Differentiated Services Field (DS Field) in the IPv4 and IPv6 Headers," Network Working Group, Request for Comments: 2474, Dec. 1998, 20 pages.

Blake, S., "An Architecture for Differentiated Services," Network Working Group, Request for Comments: 2475, Dec. 1998, 51 pages.

Floyd, Sally et al., "Random Early Detection Gateways for Congestion Avoidance," IEEE/ACM Transactions on Networking, vol. 1, No. 4, Aug. 1993, 17 pages.

Feng, Wu-chun, "GREEN: Proactive Queue Management over a Best-Effort Network," IEEE GlobeCom (GLOBECOM 2002), Taipei, Taiwan, Nov. 2002, 5 pages.

XRAN, xRAN Fronthaul Working Group, "Control, User and Synchronization Plane Specification," XRAN-FH.CUS.0.-v01.00, 2018, 61 pages.

* cited by examiner

METHODS AND APPARATUS FOR PACKET DROPPING IN A FRONTHAUL NETWORK

CROSS REFERENCE TO RELATED APPLICATIONS

This application is a 35 U.S.C. § 371 national stage application of PCT International Application No. PCT/EP2019/051372 filed on Jan. 21, 2019, the disclosure and content of which is incorporated by reference herein in its entirety.

TECHNICAL FIELD

Embodiments described herein relate to methods and apparatus for managing packet dropping in a fronthaul network in a radio network. In particular the management of the packet dropping in the fronthaul network is based on information relating to the transmission of radio data in the packets over a radio access interface in the radio network.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly, as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

In packet-based network interfaces, packets are queued or buffered prior to transmission, to accommodate different rates of arrival and/or departure. The size of the buffer available for queuing packets may be finite. When packets exceeding the buffer size arrive, they may be dropped, which may cause packet loss events that might have adverse effects on certain applications. If the buffer is too large, packets might be queued for excessive amount of time also affecting certain applications. Large packet buffers also increase the complexity of the node. Packets may also be dropped intentionally, to satisfy quality of service requirements (for example, to achieve fair resource allocation between different flows).

Many schemes have been proposed to manage queues in networks. Examples include Ethernet priority-based flow control with pause frames (IEEE 802.1Qbb), RED (random early detection), Diffserv (in which different classes of service are used to prioritize certain flow classes against others), BLUE (a hybrid flow and queue based congestion control scheme that uses packet loss (queue) and link underutilization (flow) events to adjust the rate of congestion notification), GREEN (a proactive queue management scheme which regulates TCP flows over the same link to a fair sending rate and hence prevents them from inducing congestion) and L4S (a low-latency, low-loss scalable throughput scheme).

In 5G, the connections between baseband nodes and radio nodes, called fronthaul links, may be packet-based, and may carry time-sensitive Long Term Evolution (LTE) or New Radio (NR) physical layer data. The utilization of these fronthaul links may fluctuate depending on the number of user equipments (UEs) being served. Furthermore, fronthaul links may be shared between multiple nodes of a base station for example Radio Units (or Remote Radio Units) and Digital Units. The fact that fronthaul links are not dedicated to a particular base station might lead to unacceptable queueing (due to excessive traffic being transmitted simultaneously) or packet losses that have detrimental effect on performance in the radio network of the air interfaces to the wireless devices.

FIG. 1 illustrates an example of a fronthaul network. In this example, multiple digital units DU 1 to DU n, are connected to multiple Radio Units RU 1 to RU m via intermediate network nodes 101 and 102, for example switches or multiplex routers. In this disclosure the terms DU (Digital Unit), BU or BBU (Baseband unit), refer to a node of the base station that executes a majority of the baseband processing. Similarly, in this disclosure the terms RU (Radio Unit), RRU (remote radio unit) or IRU (indoor radio unit) are used to refer to nodes of the base station that comprise Radio Frequency (RF) circuitry. Sometimes specific CPRI terminology may be used in this disclosure for these nodes when the CPRI protocol is used. In these examples, the REC (radio equipment control) or eREC (eCPRI radio equipment control) may be equivalent to the DU, and the RE (CPRI radio equipment) or eRE (eCPRI radio equipment) may be equivalent to the RU.

Current solutions for active queue management are predominantly developed with the Internet as a target. As such the parameters are tuned to serve internet applications that do not have as strict requirements as those for a radio fronthaul network. Also, since the current solutions are targeting generic layer 3 services, the current solutions for queue management techniques may affect the performance of the radio network in an unpredictable way.

A packet-based fronthaul application may encapsulate LTE/NR PHY symbols in layer 2 (Ethernet) frames. When these frames are discarded (due to lateness or frame check sequence errors, for example) the resulting radio signal will have missing LTE/NR PHY symbol content. This leads to lower throughputs, retransmissions and increased delay for the UEs or even disconnects If a previous active queue management solution is applied to a fronthaul application, the packet drops that may occur to manage queue lengths may cause low air-interface throughput even when radio channel conditions are good, without any possible control by the base station.

A possible solution for these problems is to coordinate the scheduling of air-interface grants between base stations that share fronthaul links or adjust fronthaul traffic compression in such a way that the traffic stays below a queueing threshold. However, keeping the traffic below a queuing threshold has the disadvantage of requiring some coordination (and possibly logical interfaces) between different schedulers, where the different schedulers may be executed in different hardware nodes.

SUMMARY

According to embodiments described herein there is provided a method in a packet processing system in a fronthaul network in a radio network, for managing packet dropping in the fronthaul network. The method comprises receiving a plurality of data packets for transmission over the fronthaul network, wherein the plurality of data packets comprise radio data; obtaining first information for the plurality of data packets, wherein the first information is related to transmission of the radio data over a radio access interface in the radio network; and responsive to a requirement to decrease a load in the fronthaul network, selecting at least one of the plurality of packets to drop by applying at least one prioritization rule to the plurality of data packets based on the obtained first information.

According to some embodiments there is provided a method in a packet mapping node in a fronthaul network in a radio network for managing packet dropping in the fronthaul network. The method comprises receiving radio data comprising data units for transmission over the fronthaul network; obtaining second information for the data units, wherein the second information relates to transmission of the radio data over a radio access interface in the radio network; and forming the data units into at least one data packet comprising a plurality of the data units by applying at least one rule to the second information.

According to some embodiments there is provided a method in a controller node in a fronthaul network in a radio network. The method comprises controlling at least one prioritization rule to be applied by a packet processing system to a plurality of data packets comprising radio data in order to select at least one of the plurality of packets to drop, wherein the at least one prioritization rule is based on first information for the plurality of data packets, wherein the first information is related to transmission of the radio data over a radio access interface in the radio network.

According to some embodiments there is provided a packet processing system in a fronthaul network in a radio network, for managing packet dropping in the fronthaul network. The packet processing system comprises processing circuitry configured to receive a plurality of data packets for transmission over the fronthaul network, wherein the plurality of data packets comprise radio data; obtain first information for the plurality of data packets, wherein the first information is related to transmission of the radio data over a radio access interface in the radio network; and responsive to a requirement to decrease a load in the fronthaul network, select at least one of the plurality of packets to drop by applying at least one prioritization rule to the plurality of data packets based on the obtained first information.

According to some embodiments there is provided a packet mapping node in a fronthaul network in a radio network for managing packet dropping in the fronthaul network. The packet mapping node comprises processing circuitry configured to receive radio data comprising data units for transmission over the fronthaul network; obtain second information for the data units, wherein the second information relates to transmission of the radio data over a radio access interface in the radio network; and form the data units into at least one data packet comprising a plurality of the data units by applying at least one rule to the second information.

According to some embodiments there is provided a controller node in a fronthaul network in a radio network. The controller node comprising processing circuitry configured to control at least one prioritization rule to be applied by a packet processing system to a plurality of data packets comprising radio data in order to select at least one of the plurality of packets to drop, wherein the at least one prioritization rule is based on first information for the plurality of data packets, wherein the first information is related to transmission of the radio data over a radio access interface in the radio network.

BRIEF DESCRIPTION OF THE DRAWINGS

For a better understanding of the present embodiments, and to show how they may be put into effect, reference will now be made, by way of example only, to the accompanying drawings, in which.

DESCRIPTION

Figure 1:
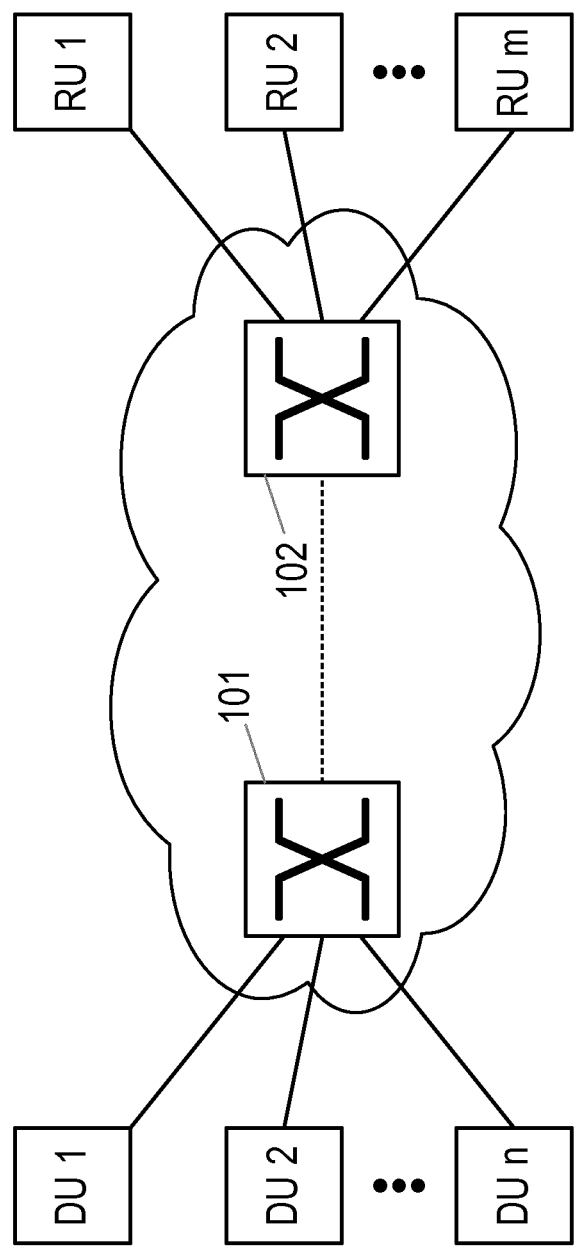
FIG. 1 illustrates an example of a fronthaul network.

The following sets forth specific details, such as particular embodiments for purposes of explanation and not limitation. But it will be appreciated by one skilled in the art that other embodiments may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers that are specially adapted to carry out the processing disclosed herein, based on the execution of such programs. Nodes that communicate using the air interface also have suitable radio communications circuitry. Moreover, the technology may additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors, one or more processing modules or one or more controllers, and the terms computer, processor, processing module and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

Embodiments described herein provide methods for and apparatus for managing packet dropping in a packet based fronthaul network. By using first information relating to the transmission of the radio data in the packets over a radio access interface in the radio network to determine which packets to drop, the proposed methods and apparatus may minimize or reduce the impact of packet drops in the fronthaul network on the end-user experience, or wireless device experience. The radio data may comprise data which is fronthauled, for example, processed to be transmitted from, or received from a radio unit, e.g. I/Q data. The radio data may be transmitted to a DU for baseband processing.

The methods and apparatus described herein may be deployed for example, in base station nodes, switches, routers and interface cards. Some embodiments described herein may assume that the fronthaul applications transport frequency domain symbols or sub-band content of radio signals.

As the embodiments described herein make use of first information relating to the transmission of the radio data in the data packets over a radio access interface in the radio network, it is possible to differentiate fronthaul packets according to their importance to the Radio Access Network (RAN), or to the effect that dropping the packet may have on the RAN. Packet drops used to manage latency and/or congestion in the fronthaul network may therefore be targeted to specific flows so as to reduce any detrimental effect on the mobile end-user experience over the RAN.

In some examples, packet inspection for network management is not available in intermediate nodes in the fronthaul network, or such inspection cannot reach above the transport layer. In these examples, the node transmitting the packets (for example, the Radio Equipment Controller (REC) or Radio Equipment (RE)) may translate information relating to the radio access network robustness and/or priority concepts in to first information that may then be understood by the intermediate nodes. For example, the first information may comprise lower-level field indications (in the case of e.g. Differentiated Services (Diffserv) or Virtual Local Area Network (VLAN) tags).

In some examples, the radio data may be organized into packets by considering second information relating to the transmission of the radio data over a radio access interface in the radio network (for example, in the case of e.g. Random Early Detection (RED) and related methods). By organizing the radio data into packets by considering such second information, network management is enabled using minimal configuration of intermediate nodes in the fronthaul network.

For conciseness, the following discussion assumes downlink transmission. It will be appreciated that corresponding methods are applicable to uplink direction.

In fronthaul applications, especially those with an intra-physical layer (PHY) functional split, there may be stringent time constraints for the transmission of fronthaul packets between base station nodes. The motivation for this is that the radio physical layer in Orthogonal Frequency Division Multiplex (OFDM) systems (such as Long Term Evolution (LTE) and New Radio (NR)) may require strict synchronization and may operate on a fixed time-frequency grid. A constant number of OFDM symbols may therefore be transmitted per time unit, depending on the system numerology (e.g. 14 OFDM symbols per millisecond in LTE).

Prior to an OFDM symbol transmission, the scheduled control and user data channels may be required to be available at the radio unit so that precoding (digital beamforming) and OFDM modulation might be executed at the OFDM symbol boundaries in time. Since the contents for control channels, shared channels (user data) and precoding coefficients (optionally) may be transmitted using packets (e.g. Ethernet, Internet Protocol (IP) or User Datagram Protocol (UDP)), missing packets may cause the resulting OFDM symbol to not be entirely loaded (for example, as not all scheduled resource blocks will be filled) and/or may decrease the gain due to imperfect precoding/beamforming. If a packet is not lost, but arrives delayed for the transmission interval to which the content of the packet belongs, the radio unit (or baseband node) may discard the packet.

The main factors affecting whether or not fronthaul packets are delivered in time may be propagation delay, network node processing delay, and queueing in network nodes. From these factors, the last factor may be influenced by actions taken within the fronthaul network nodes. Embodiments described herein therefore focus on controlling this last factor to reduce or minimize the effect of dropped fronthaul packets on the end user experience in the radio network.

An advantage of packet-based fronthaul interfaces is that the load in the fronthaul network will be proportional to the load in the radio access interface or air interface, i.e. the load on the interface to the user equipment (UE). Packets may also inherit the underlying benefits of statistical multiplexing (for example, the packets may not be dimensioned for peak demand as end nodes will most of the time generate low to moderate traffic). Packet-based traffic may be efficiently aggregated, operators may share their fronthaul infrastructure between multiple baseband-radio unit pairs. In some examples, multiple cells may use shared hardware resources.

For example, in situations where the traffic from one or multiple cells compete for the same outbound physical interface, the queue build-up may lead to packets being delayed and to unpredictable radio performance degradation. As an example, consider the following scenario:

Two cells (Cell1, Cell2) are implemented in the same baseband hardware and share an outbound physical fronthaul network interface. Cell1 allocates a user with a high modulation and coding scheme (MCS) and multiple layers. Cell2 allocates multiple users with a low MCS, but the packets from Cell2 reach the outbound network interface first, leading to the traffic from Cell1 being queued. The queueing at the output interface causes Cell1 fronthaul traffic to be delayed and eventually dropped at the radio unit (due to missing a timing requirement such as, for example, missing the symbol boundary). Total spectral efficiency would therefore be diminished due to inappropriate fronthaul queueing.

Figure 2:
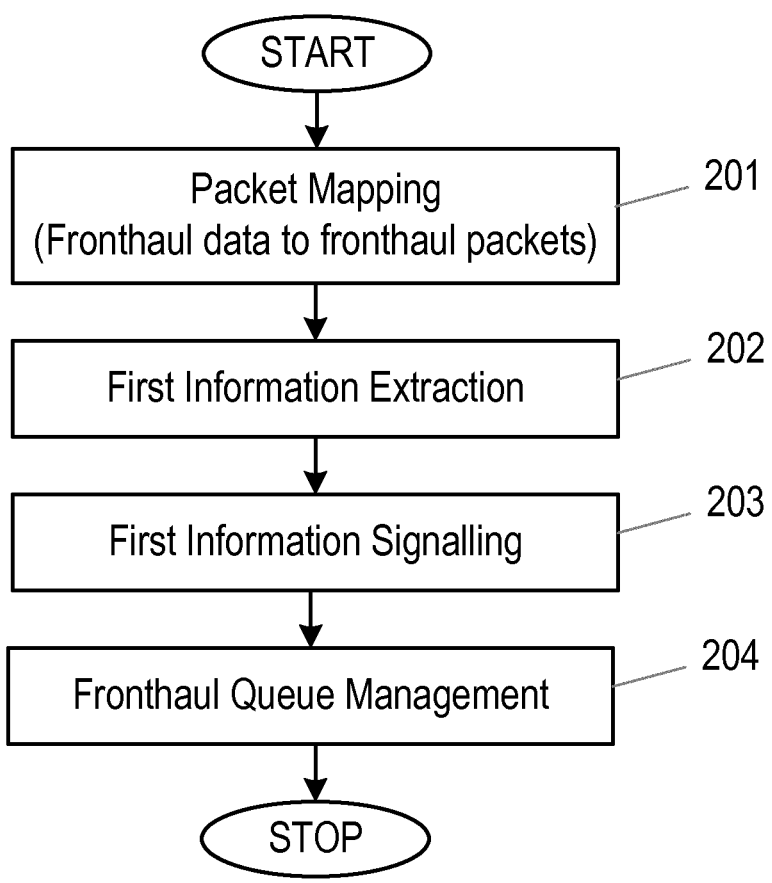
FIG. 2 illustrates a method of managing packet dropping in a fronthaul network in a radio network according to some embodiments.

FIG. 2 illustrates a method of managing packet dropping in a fronthaul network in a radio network according to some embodiments. In some examples, at least part of the method is implemented in a node of the radio access network.

In step 201, the method comprises packet mapping by a packet mapping node. In this step radio data is formed into data packets for transmission in the fronthaul network. This step will be described in more detail with reference to FIG. 3.

The packet mapping node may form part of any node in the fronthaul network. For example, the packet mapping node may form part of a Digital Unit, Radio Unit, or any intermediate node.

In step 202, first information relating to the transmission of the radio data over a radio access interface in the radio network is obtained by the packet mapping apparatus. For example, the radio access interface may comprise the air interface between a user equipment or wireless device and a node in the radio access network. The first information may therefore be indicative of a robustness of the air interface or an efficiency of transmission over the air interface.

In step 203, the first information is signaled to a packet processing system. The packet processing system may form part of any node in (or connected to) the radio access network, e.g. fronthaul network.

In step 204 fronthaul queue management is performed by the packet processing system based on the first information received in step 203. This step will be described in more detail with reference to FIG. 4.

Figure 3:
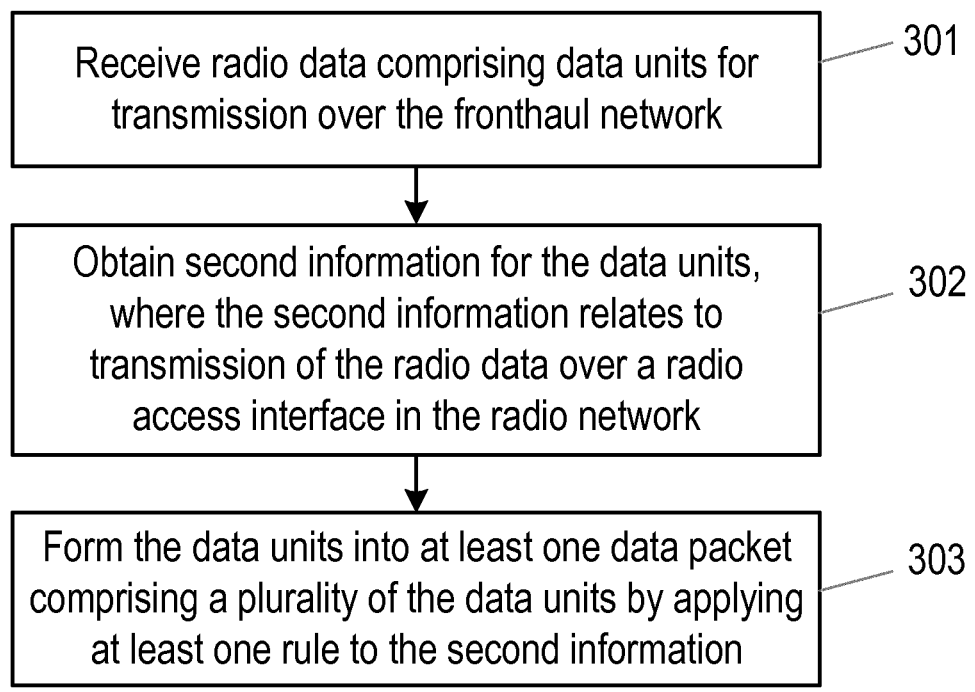
FIG. 3 illustrates a method, in a packet mapping node in a fronthaul network in a radio network, for managing packet dropping in the fronthaul network.

FIG. 3 illustrates a method, in a packet mapping node in a fronthaul network in a radio network, for managing packet dropping in the fronthaul network. This Figure illustrates step 201 of FIG. 2 in more detail according to some embodiments.

In step 301, the packet mapping node receives radio data comprising data units for transmission over the fronthaul network.

In step 302, the packet mapping node obtains second information for the data units, wherein the second information relates to transmission of the radio data over a radio access interface in the radio network. For example, the second information may relate to the transmission of the radio data over an air interface between a user equipment or wireless device and a remote radio unit or base station in the radio network.

The second information for a data unit of the data units may comprise one or more of: an identification of a destination or originating user for the data unit; an identification of a logical channel radio bearer for the data unit; a layer on which the data unit is to be transmitted; a radio bearer for the data unit; and a fronthaul flow category for the data unit.

In step 303, the packet mapping node forms the data units into at least one data packet comprising a plurality of data units by applying at least one rule to the second information. It will be appreciated that the second information and the first information may comprise similar radio transmission properties. In particular, any radio transmission property given in this disclosure as an example of first information may also be an example of second information, and vice versa.

The at least one rule may comprise performing the step 303 such that each data packet comprises data units for a single user or users forming part of a single multi user-multiple input, multiple output, MU-MIMO, user group. For example, the packet mapping node may collect together data units into a packet whose packet information indicates that the data units are for a single user or for users forming part of a single multi user group. This enables a packet processing system to target a particular user or MU-MIMO group when selecting which packets to drop.

The at least one rule may comprise performing the step 303 such that each data packet contains data units for a single logical channel. For example, the packet mapping node may collect together data units into a packet whose packing information indicates that the data units are for a single logical channel. This enables a packet processing system to target a particular logical channel when selecting which packets to drop.

The at least one rule may comprise performing the step 303 such that each data packet comprises data units for a single layer. For example, the packet mapping node may collect together data units into a packet whose packing information indicates that the data units are for a single layer. This enables a packet processing system to target a particular layer when selecting which packets to drop.

The at least one rule may comprise performing the step 303 such that each data packet comprises data units for a single radio bearer. For example, the packet mapping node may collect together data units into a packet whose packing information indicates that the data units are for a single radio bearer. This enables a packet processing system to target a particular radio bearer when selecting which packets to drop.

The at least one rule may comprise performing the step 303 such that each data packet comprises data units for a single fronthaul flow category. For example, the packet mapping node may collect together data units into a packet whose packing information indicates that the data units are for a single fronthaul flow category. This enables a packet processing system to target a particular single fronthaul flow category when selecting which packets to drop.

The different rules allow the packet processing system receiving the packets in step 203 of FIG. 2, to differentiate between fronthaul flow categories (e.g. prioritizing sync packets), to target an individual user, MU-MIMO user group, logical channel radio bearer, and/or layer when packet drops are executed. In this way the performance loss over the radio access interface can be managed with increased granularity. Some embodiments may select one or more of the above rules to balance granularity and efficiency (due to header overhead in packets, for example).

The method illustrated in FIG. 3 may be performed by a packet mapping node. The packet mapping node may be part of a shared baseband architecture implementation (for example for downlink traffic), and may also be part of a radio unit implementation (for example for uplink traffic). In some examples, the packet mapping node is implemented in nodes with access to scheduling information. For example, the packet mapping node may be implemented in for example one or both of the RAN endpoints (i.e. the baseband hardware and the remote radio unit (RRU)), but in some examples, the packet mapping node may be part of an intermediate node (for example an aggregation node, or interface converter).

Returning to FIG. 2, in step 202, the first information relating to the transmission of the radio data over a radio interface in the radio network is determined or obtained based on the received packets.

Given that the packets have been formed based on second information relating to the radio data, the first information relating to each packet may indicate, for example, one or more of: which user or MU-MIMO group of users is contained in the packet; which logical channel(s) is in use; which layer number(s) is in use in the packet; which Modulation Coding Scheme (MCS) is in use in the packet;

which retransmission attempt that packet relates to; and/or which radio bearer the data in the packet belongs to.

The first information may be obtained by looking at the output of the RAN scheduler as well as the output of step 201 (some of the first information may be inferred by looking at the packet contents itself—for example, the first information may comprise pairs of addresses that identify cell identities and REC-RE pairings). Note that for downlink, the scheduling information may be available locally. For the uplink direction the scheduling information may be typically transmitted from baseband node to the radio node for example, to aid in resource element de-mapping. This scheduling information may be reused by the radio node to determine the first information. This step may also be performed by the packet mapping node.

The first information may then be signaled to a packet processing system as in step 203 of FIG. 2.

In some examples step 203 of FIG. 2 may comprise explicit signaling, for example, step 203 may comprise using an eCPRI message type 2 (real-time control data) to signal the first information to the packet processing system. In other words, the packet processing system may receive a first information message comprising the first information for a particular packet.

The eREC and eRE nodes may, for example, encode the first information into the payload of an eCPRI type 2 message. This implementation may provide a high degree of flexibility as a considerable quantity of first information may be signaled to the packet processing system. A type 2 message may be transmitted prior to a sequence of type 0, 1 messages (which may be used to convey in phase and Quadrature (I/Q) data and binary messages respectively). The value of the type 2 header field Real-Time Control Identifier RTC_ID may be set as the same as the value of the Physical Channel Identifier PC_ID messages to which the first information refers to.

In some examples, step 203 of FIG. 2 may comprise encoding the first information into the packets. For example, the packet processing system may receive the first information as part of a header in a packet in the plurality of packets. For example, a Physical Channel Identifier, PC_ID, or a Real-Time Control Identifier, RTC_ID, field in the header in the packet may comprise the first information.

For example, explicit signaling using eCPRI PC_ID and RTC_ID fields for messages of type 0, 1 and 2 may be used.

The eREC and eRE nodes may for example, encode the first information using the PC_ID header field in messages of type 0, 1 and the RTC_ID field in messages of type 2. These fields may convey an identification of a fronthaul "flow". For example, a type 2 message may precede a sequence of messages of type 0 or 1 (the choice may depend on the functional split and/or the traffic direction) and may inform either the REC or RE on how to interpret the following messages. The choice of how to choose the value of the fields may be a vendor decision. For example, the 2-byte (16 bits) field may be used to convey the first information as listed above. The encoding of the first information may be implementation dependent.

In some examples, a header field, or a subsection of a header field, may be explicitly used to convey a value that specifies the priority, with which this packet should be considered in case of intentional drops. In other words, in this example, the first information is an indication of a priority value assigned to a packet of the plurality of packets. By encoding the first information into a Physical Channel Identifier, PC_ID, or a Real-Time Control Identifier, RTC_ID, field of a packet header, may be an efficient implementation, as the chosen protocol fields are part of the eCPRI specification, and have a fixed offset. This implementation may avoid complicated lookups in the payload section of an eCPRI message.

In some examples, a Differentiated Services (Diffserv) Code Point, DSCP, field or traffic class bits in the header in the packet may comprise the first information.

A Diffserv-based implementation may use the 6-bit DSCP field in the IPv4 header or (some of) the Traffic Class bits in the IPv6 header. While the 64 available values in the 6-bit DSCP may be used to indicate the first information, some of these may be defined in the standards and are generally built-into switches and routers. A backwards-compatible classification of fronthaul flows may then use these built-in per-hop behaviors, such as "Default forwarding" for best-effort, "Expedited forwarding" for low-loss and/or low-latency, and "Assured forwarding" for guaranteed delivery at limited rates. In this case, best-effort traffic may be used for transmissions with small MCS or otherwise high coding redundancy due to their higher robustness to packet drops; while "assured forwarding" may be used indicating that higher classes are more important, and packets of the same class are dropped according to their drop precedence (for example, according to their encoding MCS value, number of layers, etc.)

In some examples, a Virtual Local Area Network, VLAN, tag comprises the first information.

For example, for 802.1Q VLAN tags, the 12-bit VLAN identifier (VID) field allows 4094 possible values. These values allow for the possibility of encoding the first information into the VLAN tag, this time with more granularity than for the Diffserv embodiment described above. Furthermore, there is a 3-bit priority code point (PCP) that allows further differentiation of traffic classes. Finally, a one-bit drop eligible indicator (DEI) may also be available to comprise first information to indicate packets that may be dropped first in case of congestion, in other words, the VLAN tag may comprise first information which comprises an indication of a priority value assigned to a packet of the plurality of packets.

It is important to note that the first information may comprise only a priority value indicated in the PCP in the VLAN tag, i.e. without any explicit signaling of information from which the priority value is derived (for example the originating or destination node of the packet), in deployments where the VID is already in use, since a packet may not belong to more than one VLAN. Alternatively, some networks may have support for double tagging (IEEE 802.1ad), in which case one of the VLAN tags may be used exclusively for fronthaul purposes.

In deployments where layer 2 encryption (IEEE 802.1AE MACsec) is enabled, the VLAN tagging scheme in the previous paragraphs may still be feasible when "tag in the clear" capabilities are available. Otherwise, differentiation of traffic may only become possible in endpoints or aggregator nodes before the first fronthaul link.

Figure 4:
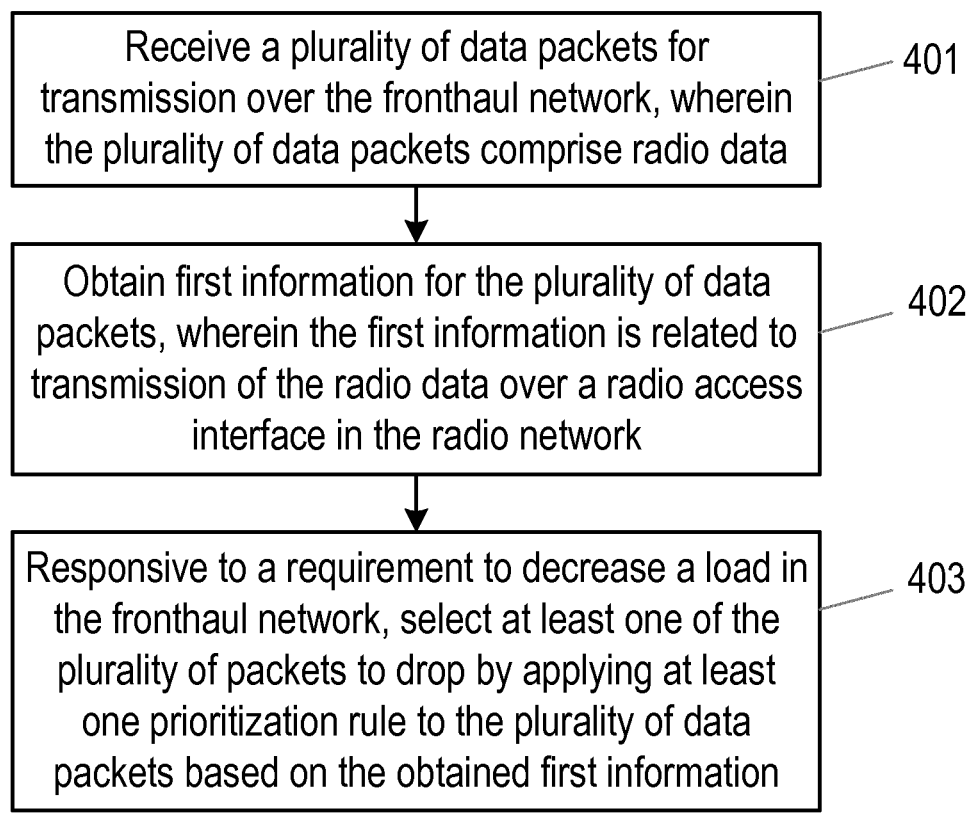
FIG. 4 illustrates a method in a packet processing system in a fronthaul network in a radio network, for managing packet dropping in the fronthaul network.

FIG. 4 illustrates step 204 of FIG. 2 in more detail. In particular FIG. 4 illustrates a method in a packet processing system in a fronthaul network in a radio network, for managing packet dropping in the fronthaul network.

In step 401, the packet processing system receives a plurality of data packets for transmission over the fronthaul network, wherein the plurality of data packets comprises radio data.

In step 402, the packet processing system obtains first information for the plurality of data packets, wherein the first information is related to transmission of the radio data over a radio access interface (i.e. air interface) in the radio network. As described previously, the first information may be transmitted to the packet processing system using explicitly signaling or may be encoded in to the plurality of data packets.

In step 403, responsive to a requirement to decrease a load in the fronthaul network, the packet processing system select at least one of the plurality of packets to drop by applying at least one prioritization rule to the plurality of data packets based on the obtained first information.

As described previously the first information may comprise information related to an effect that dropping each of the at least one data packet would have on the communication between the network and the wireless device(s), e.g. an efficiency of the transmission of the radio data in the packet over the radio access interface (i.e. air interface). The first information may also comprise a priority value which is derived from such information.

In some examples, the first information for a packet of the plurality of data packets is derived from an originating or destination radio network node for the packet. For example, the originating or destination radio network node for the packet may be part of the first information, or the first information may comprise a priority value derived therefrom.

In this example, the at least one prioritization rule may comprise selecting to drop a packet from a first radio network node that had a higher share of fronthaul resources during a previous time interval instead of a packet from a second radio network node that had a lower share of fronthaul resources during the previous time interval. This prioritization rule avoids starving a particular cell or radio network node.

The first information may be derived from an indication of whether the packet is corresponding to a single-user or multi-user transmission. For example, whether the packet is corresponding to a single-user or multi-user transmission may be part of the first information, or the first information may comprise a priority value derived therefrom.

In this example, the at least one prioritization rule may comprise selecting to drop a packet corresponding to single-user transmission instead of a packet corresponding to multiple-user transmission. This prioritization rule allows the packet processing system to drop packets which are only to be transmitted to a single user, resulting in any degradation of performance resulting from the packet drop being limited to only a single user, rather than multiple users.

The first information may be derived from an identification of an originating or destination user for the packet. For example, the originating or destination user may be part of the first information, or the first information may comprise a priority value derived therefrom.

In this example, the at least one prioritization rule may comprise selecting to drop a packet corresponding to a first originating or destination user instead of a packet corresponding to a second originating or destination user. This prioritization rule allows the packet processing system to target radio data to be transmitted to a particular user, resulting in any degradation of performance being limited to only that particular user, rather than any other users. This may allow for different users (i.e. user equipment) to be prioritized equally, for example allowing different users to have an approximately equal number of packets dropped for each user. Alternatively, different users may have different priorities which are reflected in the prioritization rule.

The first information may be derived from a number of layers being transmitted to the user in the packet. For example, the number of layers being transmitted to the user may be part of the first information, or the first information may comprise a priority value derived therefrom.

In this example, the at least one prioritization rule may comprise selecting to drop a packet comprising multiple-layer transmission instead of a packet comprising single-layer transmission. This prioritization rule may be used when aiming to ensure fairness between users. Alternatively, the at least one prioritization rule may comprise selecting to drop a packet comprising single-layer transmission instead of a packet comprising multiple-layer transmission. This prioritization rule may be used when throughput is considered more important than fairness between users.

In some examples, the first information may be derived from a modulation and coding scheme, MCS, for the packet. For example, the MCS for the packet may be part of the first information, or the first information may comprise a priority value derived therefrom.

In this example, the at least one prioritization rule may comprise selecting to drop a packet with a lower modulation coding scheme instead of a packet with a higher modulation coding scheme. A lower MCS means that there is less data encoded in each symbol. A higher MCS indicates that there are more data bits represented by each transmitted symbol. Therefore, packets with a lower MCS contain less data than packets with a higher MCS. Thus, to maximise the number of bits transmitted, it may be more efficient to drop the packets containing lower MCS radio data.

In some example, the first information is derived from an indication of a radio channel being transmitted in the packet. For example, the radio channel being transmitted in the packet may be part of the first information, or the first information may comprise a priority value derived therefrom.

In this example, the at least one prioritization rule may comprise selecting to drop a packet comprising user data instead of a packet comprising control channel data. This prioritization rule may prevent any degradation in control channel data.

It will be appreciated that the first information may comprise any combination of the aforementioned non-limiting examples of types of first information. Equivalently, the at least one prioritization rule may comprise any combination of the aforementioned non-limiting examples of prioritization rules, which may be applied in any suitable order. The prioritization may be a combination of a plurality of a rules, e.g. any of the rules described, which may be combined, e.g. by weighting, to generate a single priority value.

In some examples, as described above, the first information comprises an indication of a priority value assigned to a packet of the plurality of packets, and the at least one prioritization rule comprises selecting to drop packets assigned a lower priority value before selecting to drop packets assigned a higher priority value.

In this example, for example, the uplink traffic from many radio units may be aggregated prior to transmission. The priority value associated to each packet may be determined by the packet mapping node according to the example prioritization rules as described above. For example, the priority values for the packets may be assigned such that the priority for multi-user packets is higher than those for single-user packets. This means that when a packet processing system selects to drop a packet having a lower priority value in the first information, this action may therefore be targeting packets based on information relating to the transmission of the radio data within the packets over the radio access interface, for example targeting packets transmitted to a single user over packets transmitted to multi-users. The same reasoning may be applied to the other example prioritization rules described above.

For example, consider ae example strategy in which PRACH packets are preferably dropped. In other words, this strategy prevents new users of the radio access interface in circumstances where the fronthaul network is overloaded. In this example, the first information may indicate to the packet processing system whether the packet is a PRACH packet, or may simply allocate a priority value to the packet based on whether the packet is a PRACH packet.

In some examples, the active queue management and/or flow control strategy can be configured in the network nodes by means of an Operations and Management (OAM) node. In other words, the fronthaul network may comprise a controller node. The controller node may be configured to control at least one prioritization rule to be applied by a packet processing system to a plurality of data packets comprising radio data in order to select at least one of the plurality of packets to drop, wherein the at least one prioritization rule is based on first information for the plurality of data packets, wherein the first information is related to transmission of the radio data over a radio access interface in the radio network.

The controller node may form part of any node within the fronthaul network, or may be an external node to the fronthaul network coupled to control the relevant packet mapping node and packet processing system appropriately.

Figure 5:
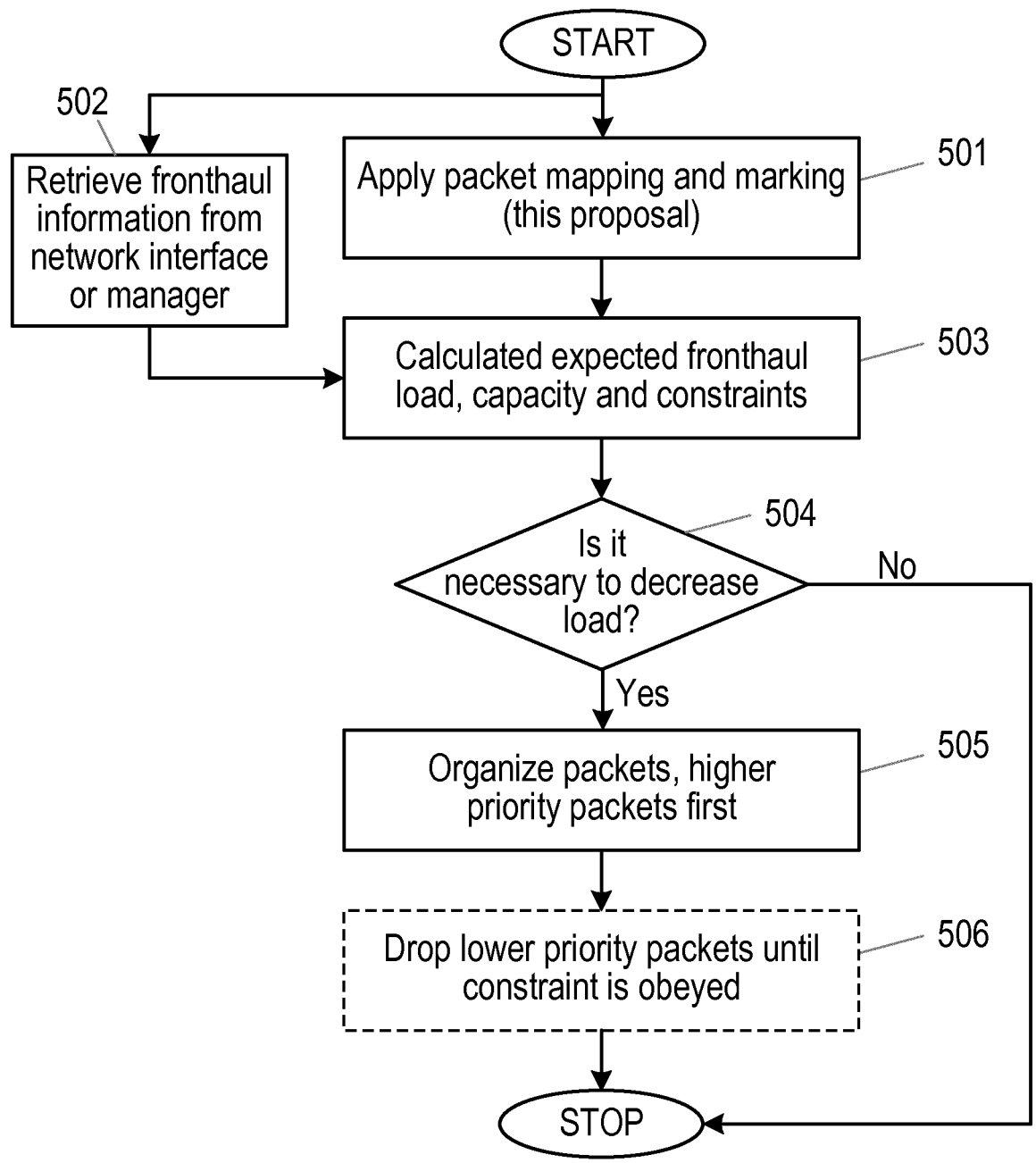
FIG. 5 illustrates a method of dropping packets according to some embodiments.

FIG. 5 illustrates a method of dropping packets according to some embodiments.

In step 501, the method comprises applying packet mapping according to the method illustrated in FIG. 3. This step may be performed by a packet mapping node.

In step 502, the method comprises retrieving fronthaul information from the network interface of a network manager. The fronthaul information may indicate a load on the fronthaul network.

In step 503, the method comprises calculating the expected fronthaul load, capacity and any constraints on the fronthaul network. This may be based on the fronthaul information retrieved in step 502.

In step 504, the method comprises determining whether the load on the fronthaul network is to be decreased. If not the method ends.

If the load on the fronthaul network is to be decrease, the method passes to step 505 in which the packets generated in step 501 are organized according to their priority, based on for example, the first information signaled to the packet processing system as described in FIG. 4. This step may be performed by a packet processing system.

In step 506 the packet processing system selects packets to be dropped based on their priority until the constraints determined in step 503 are met. The selected packets are dropped, for example, by the node comprising the packet processing system, or using a control signal initiated by the packet processing system. For example, selecting to drop a packet based on a rule (e.g. selecting to drop a multi-user transmission instead of a single-user transmission) indicates that the prioritization of dropping is based on that rule. The described dropping rule indicates which characteristic of the radio transmission (i.e. transmission on the air interface) is used, optionally in combination with other rules, to determine an overall prioritization of the packet. In some examples, each rule is weighted by a weighting factor, based on a determined relative importance of the rule. The prioritization, and selecting to drop, of the packets is based on, or comprises, one or more of the prioritization rules.

Figure 6:
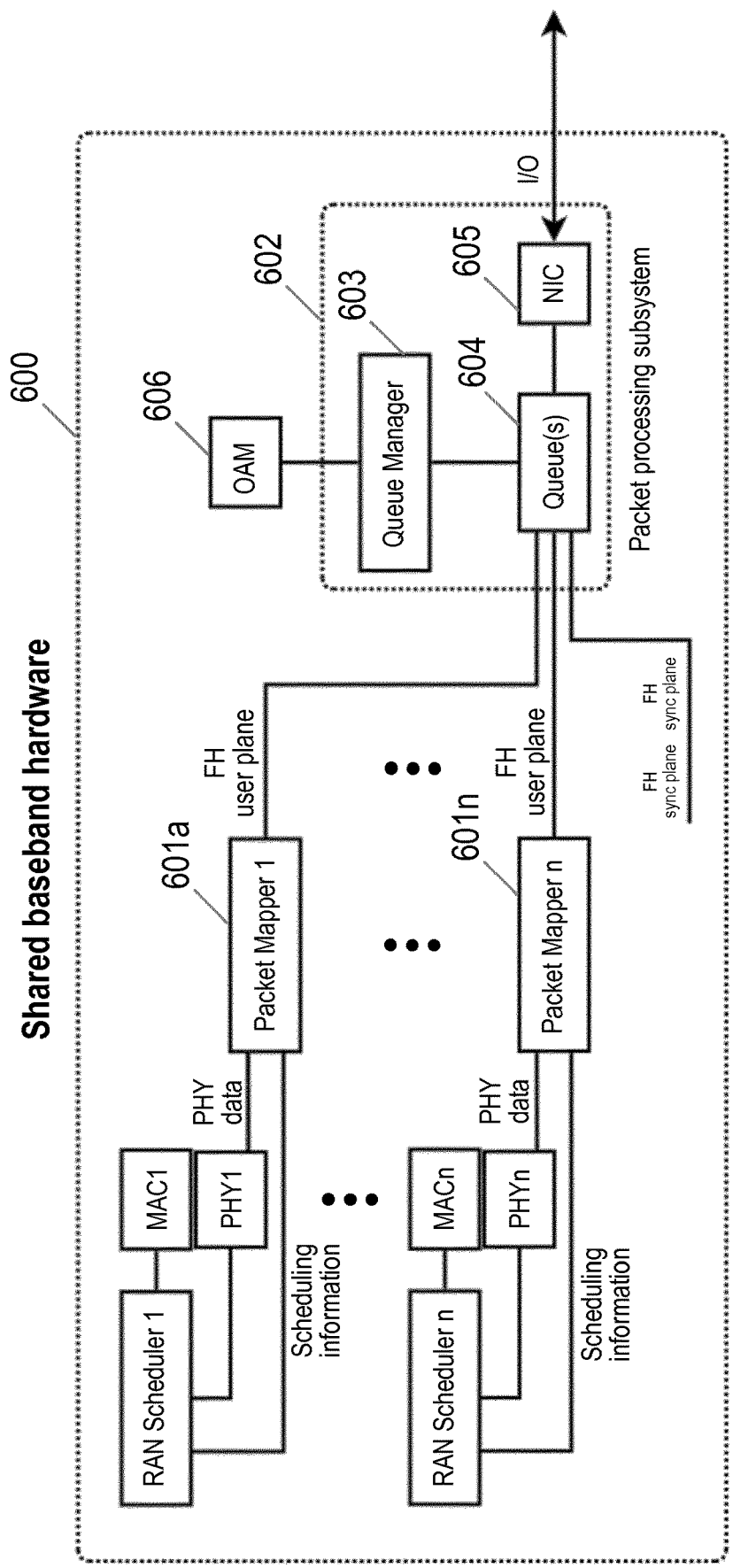
FIG. 6 illustrates an example of a shared baseband hardware according to some embodiments.

FIG. 6 illustrates an example of a shared baseband hardware 600. In this example, the shared based band architecture comprises a plurality of packet mapping nodes 601a to 601n. Each packet mapping node 601 is configured to receive downlink radio data traffic for transmission to a plurality of cells that are sharing the base band hardware. The radio data for each cell is formed into packets at the packet mapping nodes 601 as described with reference to FIG. 3. The packets are then transmitted to the packet processing system 602. The first information is either encoded into the packets, or transmitted to the packet processing system separately.

The queue manager 603 in the packet processing system 602 then applies the prioritization rules as described above with reference to FIG. 4, to determine which packets to drop in the queue 604 based on the first information. The remaining packets may then be transmitted over the fronthaul network via the network interface card 605. In this example, the prioritization rules that are applied by the queue manager 603 are controller by an Operations and Management (OAM) node 606. In this example, the OAM 606 forms part of the baseband hardware 600, however, it will be appreciated that this may be an external network node.

In this example, both the packet mapping node(s) and packet processing system form part of the shared base band architecture. However, it will be appreciated that the packet mapping node and/or packet processing system may form part of intermediate nodes within the fronthaul network.

Figure 7:
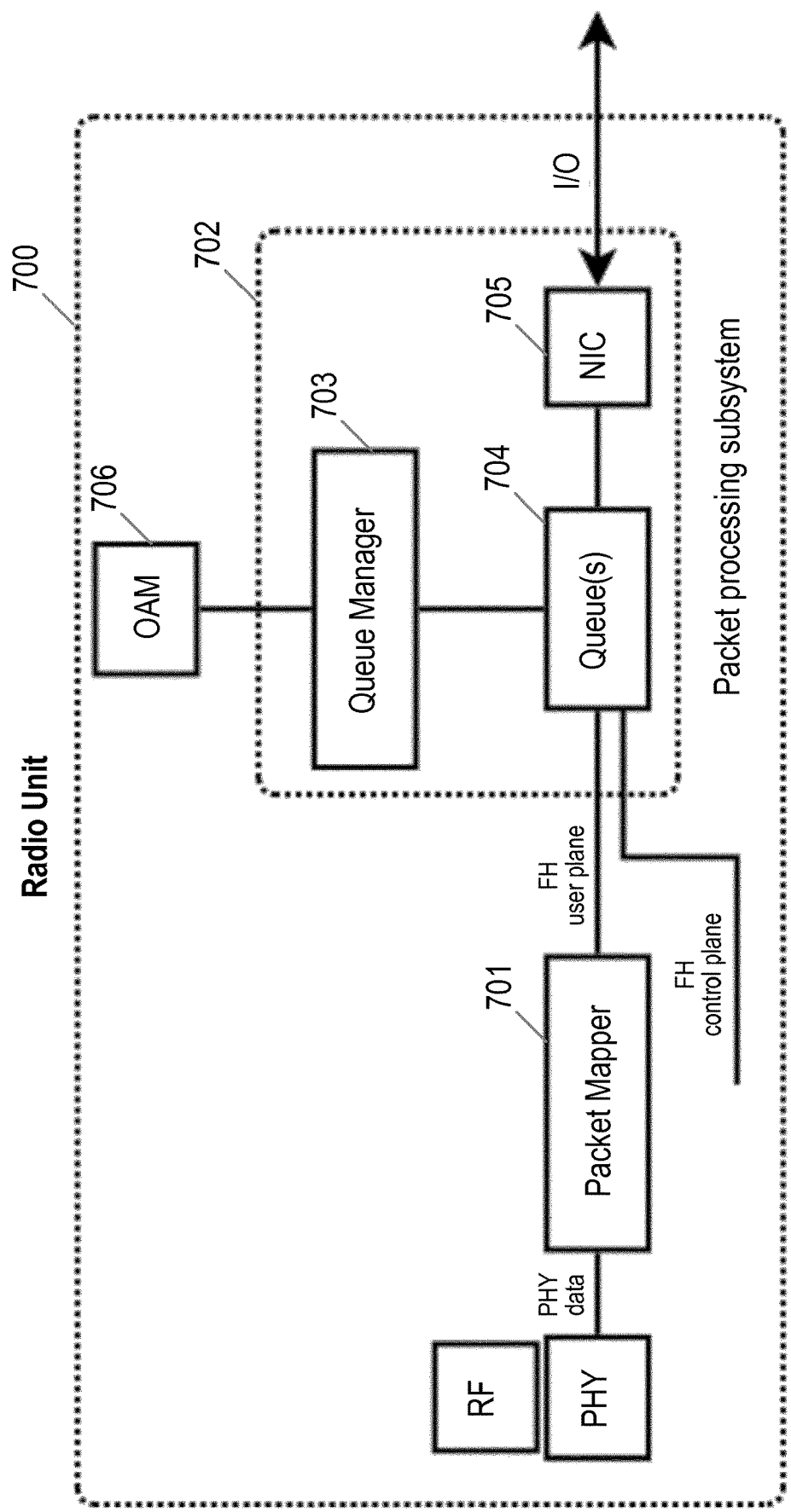
FIG. 7 illustrates an example of a Remote Radio Unit according to some embodiments.

FIG. 7 illustrates an example of a Remote Radio Unit 700 according to some embodiments.

In this example, a packet mapping node 701 is configured to receive uplink radio data traffic for transmission over the fronthaul network. The uplink radio data is formed into packets by the packet mapping node 701 as described with reference to FIG. 3. The packets are then transmitted to the packet processing system 702, along with the first information. The queue manager 703 in the packet processing system 702 then applies the prioritization rules as described above with reference to FIG. 4, to determine which packets to drop in the queue 704 based on the first information. The remaining packets may then be transmitted over the fronthaul network via the network interface card 705. In this example, the prioritization rules that are applied by the queue manager 703 are controller by an Operations and Management (OAM) node 706. In this example, the OAM 706 forms part of the Remove Radio Unit 700, however, it will be appreciated that this may be an external network node.

In this example, both the packet mapping node 701 and packet processing system 702 form part of the remote radio unit. However, it will be appreciated that the packet mapping node 701 and/or packet processing system 702 may form part of intermediate nodes within the fronthaul network.

Figure 8:
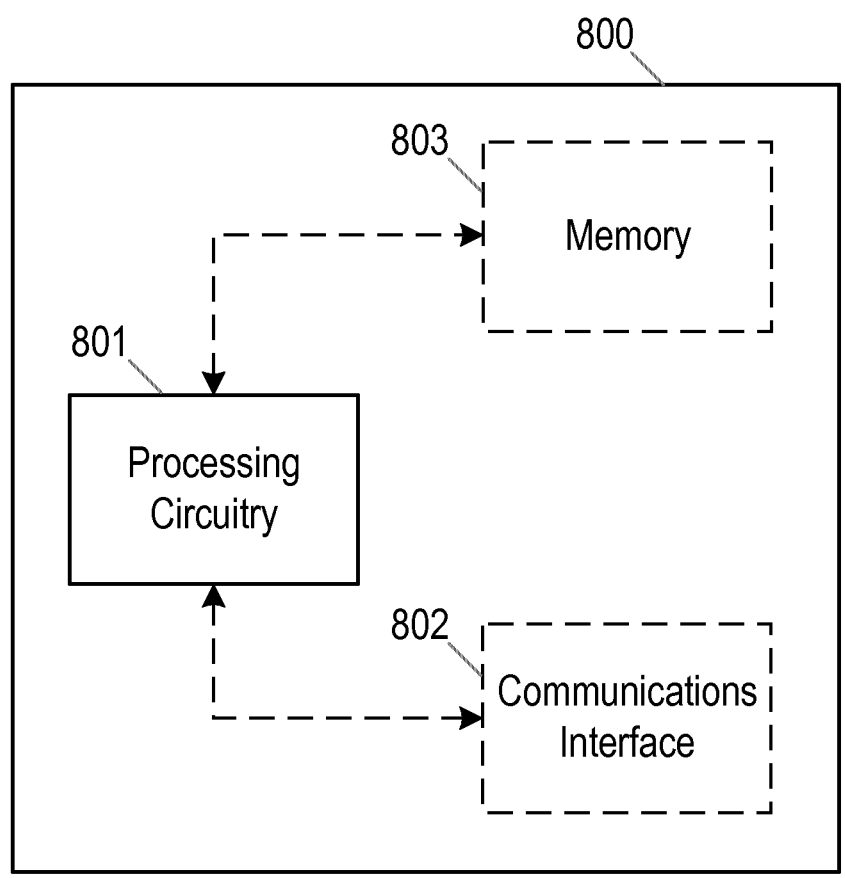
FIG. 8 illustrates a packet mapping node comprising processing circuitry (or logic) according to some embodiments.

FIG. 8 illustrates a packet mapping node 800 comprising processing circuitry (or logic) 801. The processing circuitry 801 controls the operation of the packet mapping node 800 and can implement the method described herein in relation to a packet mapping node 800. The processing circuitry 801 can comprise one or more processors, processing units, multi-core processors or modules that are configured or programmed to control the packet mapping node 800 in the manner described herein. In particular implementations, the processing circuitry 801 may comprise a plurality of software and/or hardware modules that are each configured to perform, or are for performing, individual or multiple steps of the method described herein in relation to the packet mapping node 800.

Briefly, the processing circuitry 801 of the packet mapping node 800 is configured to receive radio data comprising data units for transmission over the fronthaul network; obtain second information for the data units, wherein the second information relates to transmission of the radio data over a radio access interface in the radio network; and form the data units into at least one data packet comprising a plurality of the data units by applying at least one rule to the second information.

In some embodiments, the packet mapping node 800 may optionally comprise a communications interface 802. The communications interface 802 of the packet mapping node 800 can be for use in communicating with other nodes, such as other virtual nodes. For example, the communications interface 802 of the packet mapping node 800 may be configured to transmit to and/or receive from other nodes requests, resources, information, data, signals, or similar. The processing circuitry 801 of the packet mapping node 800 may be configured to control the communications interface 802 of the packet mapping node 800 to transmit to and/or receive from other nodes requests, resources, information, data, signals, or similar.

Optionally, the packet mapping node 800 may comprise a memory 803. In some embodiments, the memory 803 of the packet mapping node 800 can be configured to store program code that can be executed by the processing circuitry 801 of the packet mapping node 800 to perform the method described herein in relation to the packet mapping node 800. Alternatively, or in addition, the memory 803 of the packet mapping node 800, can be configured to store any requests, resources, information, data, signals, or similar that are described herein. The processing circuitry 801 of the packet mapping node 800 may be configured to control the memory 803 of the packet mapping node 800 to store any requests, resources, information, data, signals, or similar that are described herein.

Figure 9:
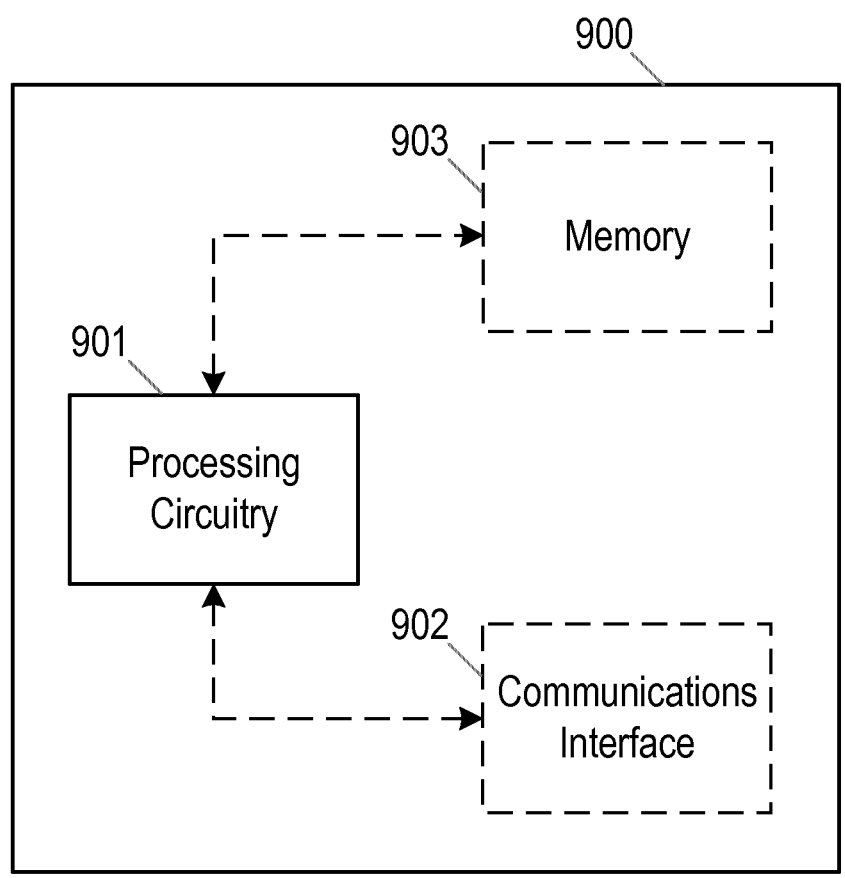
FIG. 9 illustrates a packet processing system comprising processing circuitry (or logic) according to some embodiments.

FIG. 9 illustrates a packet processing system 900 comprising processing circuitry (or logic) 901. The processing circuitry 901 controls the operation of the packet processing system 900 and can implement the method described herein in relation to an packet processing system 900. The processing circuitry 901 can comprise one or more processors, processing units, multi-core processors or modules that are configured or programmed to control the packet processing system 900 in the manner described herein. In particular implementations, the processing circuitry 901 may comprise a plurality of software and/or hardware modules that are each configured to perform, or are for performing, individual or multiple steps of the method described herein in relation to the packet processing system 900.

Briefly, the processing circuitry 901 of the packet processing system 900 is configured to receive a plurality of data packets for transmission over the fronthaul network, wherein the plurality of data packets comprise radio data; obtain first information for the plurality of data packets, wherein the first information is related to transmission of the radio data over a radio access interface in the radio network; and responsive to a requirement to decrease a load in the fronthaul network, select at least one of the plurality of packets to drop by applying at least one prioritization rule to the plurality of data packets based on the obtained first information.

In some embodiments, the packet processing system 900 may optionally comprise a communications interface 902. The communications interface 902 of the packet processing system 900 can be for use in communicating with other nodes, such as other virtual nodes. For example, the communications interface 902 of the packet processing system 900 may be configured to transmit to and/or receive from other nodes requests, resources, information, data, signals, or similar. The processing circuitry 901 of the packet processing system 900 may be configured to control the communications interface 902 of the packet processing system 900 to transmit to and/or receive from other nodes requests, resources, information, data, signals, or similar.

Optionally, the packet processing system 900 may comprise a memory 903. In some embodiments, the memory 903 of the packet processing system 900 can be configured to store program code that can be executed by the processing circuitry 901 of the packet processing system 900 to perform the method described herein in relation to the packet processing system 900. Alternatively, or in addition, the memory 903 of the packet processing system 900, can be configured to store any requests, resources, information, data, signals, or similar that are described herein. The processing circuitry 901 of the packet processing system 900 may be configured to control the memory 903 of the packet processing system 900 to store any requests, resources, information, data, signals, or similar that are described herein.

Figure 10:
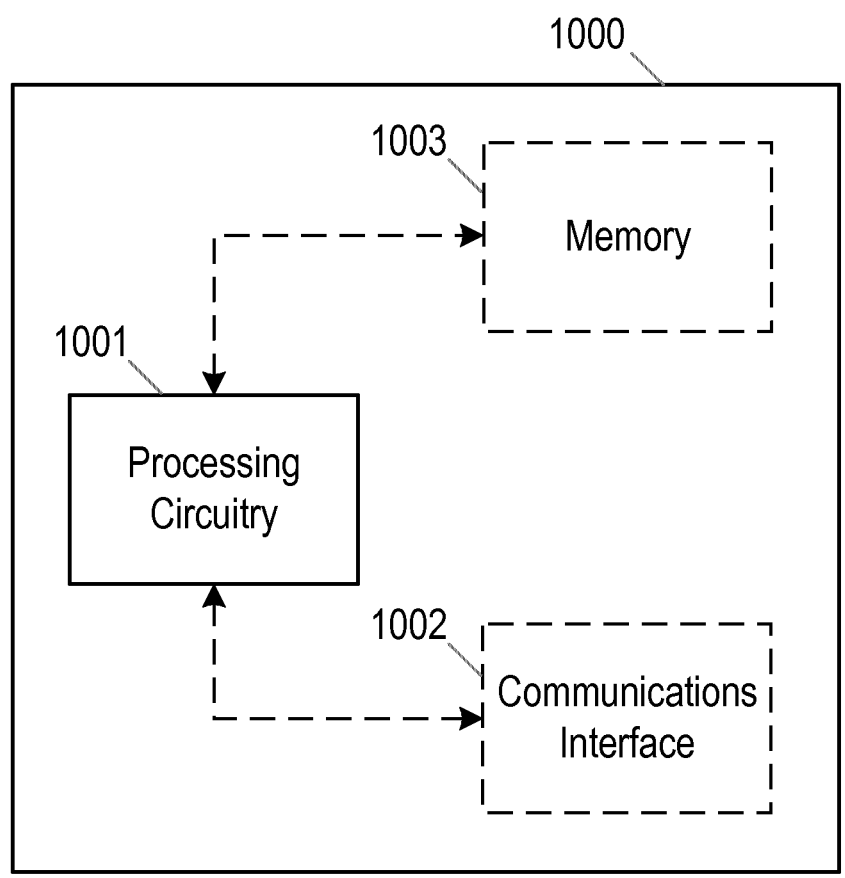
FIG. 10 illustrates a controller node comprising processing circuitry (or logic) according to some embodiments.

FIG. 10 illustrates a controller node 1000 comprising processing circuitry (or logic) 1001. The processing circuitry 1001 controls the operation of the controller node 1000 and can implement the method described herein in relation to a controller node 1000. The processing circuitry 1001 can comprise one or more processors, processing units, multi-core processors or modules that are configured or programmed to control the controller node 1000 in the manner described herein. In particular implementations, the processing circuitry 1001 may comprise a plurality of software and/or hardware modules that are each configured to perform, or are for performing, individual or multiple steps of the method described herein in relation to the controller node 1000.

Briefly, the processing circuitry 1001 of the controller node 1000 is configured to control at least one prioritization rule to be applied by a packet processing system to a plurality of data packets comprising radio data in order to select at least one of the plurality of packets to drop, wherein the at least one prioritization rule is based on first information for the plurality of data packets, wherein the first information is related to transmission of the radio data over a radio access interface in the radio network.

In some embodiments, the controller node 1000 may optionally comprise a communications interface 1002. The communications interface 1002 of the controller node 1000 can be for use in communicating with other nodes, such as other virtual nodes. For example, the communications interface 1002 of the controller node 1000 may be configured to transmit to and/or receive from other nodes requests, resources, information, data, signals, or similar. The processing circuitry 1001 of the controller node 1000 may be configured to control the communications interface 1002 of the controller node 1000 to transmit to and/or receive from other nodes requests, resources, information, data, signals, or similar.

Optionally, the controller node 1000 may comprise a memory 1003. In some embodiments, the memory 1003 of the controller node 1000 can be configured to store program code that can be executed by the processing circuitry 1001 of the controller node 1000 to perform the method described herein in relation to the controller node 1000. Alternatively, or in addition, the memory 1003 of the controller node 1000, can be configured to store any requests, resources, information, data, signals, or similar that are described herein. The processing circuitry 1001 of the controller node 1000 may be configured to control the memory 1003 of the controller node 1000 to store any requests, resources, information, data, signals, or similar that are described herein.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method in a packet processing system in a fronthaul network in a radio network, for managing packet dropping in the fronthaul network, the method comprising:
   receiving a plurality of data packets for transmission over the fronthaul network, wherein the plurality of data packets comprises radio data;
   obtaining first information for the plurality of data packets, wherein the first information is related to transmission of the radio data over a radio access interface in the radio network, wherein the first information comprises an indication of a priority value assigned to a packet of the plurality of data packets, and wherein the priority value is derived from an indication that is related to an effect that dropping each of the plurality of data packets have an efficiency of the radio network; and
   responsive to a requirement to decrease a load in the fronthaul network, selecting at least one of the plurality of data packets to drop by applying at least one prioritization rule to the plurality of data packets based on the obtained first information.

2. The method as claimed in claim 1, wherein the first information for the packet of the plurality of data packets is derived from an originating or destination radio network node for the packet.

3. The method as claimed in claim 1, wherein the at least one prioritization rule comprises:
   selecting to drop a packet from a first radio network node that had a higher share of fronthaul resources during a previous time interval instead of a packet from a second radio network node that had a lower share of fronthaul resources during the previous time interval.

4. The method as claimed in claim 1, wherein the first information is derived from an indication of whether the packet is corresponding to a single-user or multi-user transmission.

5. The method as claimed in claim 1, wherein the first information is derived from an identification of an originating or destination user for the packet.

6. The method as claimed in claim 1, wherein the first information is derived from a number of layers being transmitted to user in the packet.

7. The method as claimed in claim 1, wherein the first information is derived from a modulation and coding scheme (MCS) for the packet.

8. The method as claimed in claim 1, wherein the first information is derived from an indication of a radio channel being transmitted in the packet.

9. The method as claimed in claim 1, wherein the at least one prioritization rule comprises:
   selecting to drop a packet comprising user data instead of a packet comprising control channel data.

10. The method as claimed in claim 1, wherein the step of obtaining comprises:
    receiving the first information as part of a header in the packet of the plurality of data packets.

11. A method in a packet mapping node in a fronthaul network in a radio network for managing packet dropping in the fronthaul network, the method comprising:
    receiving radio data comprising data units for transmission over the fronthaul network;
    obtaining second information for the data units, wherein the second information relates to transmission of the radio data over a radio access interface in the radio network;
    forming the data units into at least one data packet comprising a plurality of the data units by applying at least one rule to the second information; and
    obtaining first information for the at least one data packet, wherein the first information comprises an indication of a priority value assigned to a packet of the plurality of data packets, and wherein the priority value is derived from an indication that is related to an effect that dropping each of the plurality of data packets have an efficiency of the radio network.

12. The method as claimed in claim 11, wherein the second information for a data unit of the data units comprises one of more of:
    an identification of a destination or originating user for the data unit;
    an identification of a logical channel radio bearer for the data unit;
    a layer on which the data unit is to be transmitted;
    a radio bearer for the data unit; and
    a fronthaul flow category for the data unit.

13. A packet processing system in a fronthaul network in a radio network, for managing packet dropping in the fronthaul network, the packet processing system comprising processing circuitry configured to:
    receive a plurality of data packets for transmission over the fronthaul network, wherein the plurality of data packets comprises radio data;
    obtain first information for the plurality of data packets, wherein the first information is related to transmission of the radio data over a radio access interface in the radio network, wherein the first information comprises an indication of a priority value assigned to a packet of the plurality of data packets, and wherein the priority value is derived from an indication that is related to an effect that dropping each of the plurality of data packets have an efficiency of the radio network; and
    responsive to a requirement to decrease a load in the fronthaul network, select at least one of the plurality of packets to drop by applying at least one prioritization rule to the plurality of data packets based on the obtained first information.

14. The packet processing system as claimed in claim 13, wherein the first information is derived from an indication of whether the packet is corresponding to a single-user or multi-user transmission.

15. The packet processing system as claimed in claim 13, wherein the first information is derived from an identification of an originating or destination user for the packet.

16. The packet processing system as claimed in claim 13, wherein the first information is derived from a number of layers being transmitted to a user in the packet.

17. The packet processing system as claimed in claim 13, wherein the first information is derived from a modulation and coding scheme (MCS) for the packet.

18. The packet processing system as claimed in claim 13, wherein the first information is derived from an indication of a radio channel being transmitted in the packet.

19. The packet processing system as claimed in claim 13, wherein the processing circuitry is configured to receive the first information as part of a header in a packet in the plurality of packets.

\* \* \* \* \*